(12) United States Patent
Honsho

(10) Patent No.: US 7,414,801 B2
(45) Date of Patent: Aug. 19, 2008

(54) LENS BARREL AND IMAGE PICKUP DEVICE INCLUDING LENS BARREL

(75) Inventor: Hironori Honsho, Himeji (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/130,083

(22) Filed: May 17, 2005

(65) Prior Publication Data

US 2005/0264901 A1 Dec. 1, 2005

(30) Foreign Application Priority Data

May 28, 2004 (JP) ............................. 2004-159187

(51) Int. Cl.
*G02B 7/02* (2006.01)
(52) U.S. Cl. .................. 359/819; 359/811; 359/821; 359/822
(58) Field of Classification Search ........... 359/819, 359/813, 811, 821, 822, 823
See application file for complete search history.

(56) References Cited

U.S. PATENT DOCUMENTS

| 4,639,084 | A | 1/1987 | Kugioka | |
| 7,015,959 | B1 * | 3/2006 | Morita | 348/231.9 |

FOREIGN PATENT DOCUMENTS

| JP | 60-146207 | 8/1985 |
| JP | 62-267711 | 11/1987 |
| JP | 03-150512 | 6/1991 |
| JP | 06-027374 | * 7/1992 |
| JP | 5-46926 | 7/1993 |
| JP | 05-196850 | 8/1993 |
| JP | 10-123405 | * 10/1996 |
| JP | 2751151 | 2/1998 |
| JP | 2002-107601 | 4/2002 |

OTHER PUBLICATIONS

Chinese Office Action issued in corresponding Chinese Patent Application No. CN 200510074026.1, dated Jun. 1, 2007.

* cited by examiner

*Primary Examiner*—Ricky Mack
*Assistant Examiner*—Brandi N Thomas
(74) *Attorney, Agent, or Firm*—McDermott Will & Emery LLP

(57) ABSTRACT

A lens barrel includes a fixed barrel having an approximately cylindrical shape; a lens frame 132 disposed inside of the fixed barrel for holding the lens group; at least one shaft 135A engaging in the lens frame 132 for guiding the lens frame 132 in a direction parallel to the optical axis of the lens group; and a guide shaft 135B provided to a perimeter of the lens frame for regulating a rotation of the lens frame about the shaft. The lens frame 132 is disposed in the fixed barrel so that a center axis 102 of the fixed barrel and an optical axis 101 of the lens group do not coincide with each other, but are deflected in parallel, The shaft 135A and the guide shaft 135B are disposed so that a central angle θ1 formed with respect to the center axis 102 of the fixed barrel is less than 180 degrees.

9 Claims, 13 Drawing Sheets

LENS BARREL AND IMAGE PICKUP DEVICE INCLUDING LENS BARREL

CROSS-REFERENCE TO RELATED APPLICATION

This application is based on application No. 2004-159187 filed in Japan on May 28, 2004, the content of which is hereby incorporated by reference.

BACKGROUND

1. Technical Field

The present invention relates to a lens barrel for holding optical elements, such as a lens element and an optical filter, and an image pickup device including such a lens barrel. More specifically, the present invention relates to a lens barrel having incorporated therein an electromagnetic motor including a cylindrical rotor, and an image pickup device including such a lens barrel.

2. Description of the Background Art

Digital still cameras and digital video cameras have been rapidly widespread, thanks to improvement in the degree of integration and low cost of image pick-up sensors and signal processing circuits, such as Charge Coupled Devices (CCDs) and Complementary Metal-Oxide Semiconductors (CMOS).

Also, in recent years, cellular phones, Personal Digital Assistants (PDAs), and other terminals having incorporated therein a digital camera have become quite popular. In the future, it is predicted that digital cameras will be further widespread in the fields of monitor cameras and vehicle-mounted cameras. Such a digital camera includes an image pickup device. In general, the image pickup device includes an optical system, a barrel, and an image pickup sensor.

Most digital cameras in recent years perform zooming and focusing in a motor-driven manner. Such motor-driven zooming and focusing are performed by using a motor to drive a mechanism of holding a predetermined lens element included in an optical system so as to move the lens element to a direction parallel to an optical axis.

Conventionally, the mechanism of holding the lens element has been driven by a general-purpose brushless motor. However, if the holding mechanism is driven by such a general-purpose brushless motor, a space has to be provided to the lens barrel for placing the motor, thereby increasing the size of the lens barrel. Moreover, a transmitting mechanism, such as a gear, for transmitting the rotation of the motor is required, thereby increasing the size of the lens barrel and generating noise.

In order to get around the problems, a lens driving device is disclosed in Japanese Patent Laid-Open Publication No. 5-196850. The lens driving device includes a cylindrical fixed barrel, a lens holding frame provided inside the fixed barrel for movably holding a lens element in an optical axis direction, and a shaft for guiding the lens holding frame in the optical axis direction. In the lens driving device, magnets are disposed around the perimeter of the lens holding frame to form a rotor, and a coil and a yoke are disposed around the perimeter of the rotor to form a hollow motor. In the lens driving device disclosed in Japanese Patent Laid-Open Publication No. 5-196850, the center of the magnets and the coil are deflected from the lens element held by the lens holding frame, thereby making the entire lens driving device compact in size.

However, in the lens driving device disclosed in Japanese Patent Laid-Open Publication No. 5-196850, the inner diameter of the fixed barrel is significantly large compared with the outer diameter of the lens holding frame. Therefore, in the lens driving device disclosed in Japanese Patent Laid-Open Publication No. 5-196850, a lens barrel in a direction perpendicular to the optical axis of the lens element cannot be made compact in size.

SUMMARY

Therefore, an object of the present invention is to provide a lens barrel compact in size in a direction perpendicular to the optical axis of a lens element. Also, another object of the present invention is to provide a compact image pickup device including the above lens barrel.

The objects of the present invention can be achieved by a lens barrel for movably holding a lens group along an optical axis, including: a fixed barrel having an approximately cylindrical shape; a lens frame disposed inside of the fixed barrel for holding the lens group; at least one shaft engaging in the lens frame for guiding the lens frame in a direction parallel to the optical axis of the lens group; and a rotation regulating portion provided to a perimeter of the lens frame for regulating a rotation of the lens frame about the shaft, wherein the lens frame is disposed in the fixed barrel so that a center axis of the fixed barrel and the optical axis of the lens group do not coincide with each other, but are deflected in parallel, and the shaft and the rotation regulating portion are disposed so that a central angle formed with respect to the center axis of the fixed barrel is less than 180 degrees.

With the above structure, in the lens barrel according to the present invention, the inside of the fixed barrel can be made compact compared with the case where the center axis of the fixed barrel and the optical axis coincide with each other. The lens barrel according to the present invention is compact in size in a direction perpendicular to the optical axis.

Preferably, the shaft and the rotation regulating portion are disposed so that the central angle formed with respect to the center axis of the fixed barrel is less than 90 degrees. With this structure, in the lens barrel according to the present invention, the optical axis and the center axis can be further deflected, thereby further making the lens barrel compact in the direction perpendicular to the optical axis.

Preferably, a cylindrical electromagnetic motor that is coaxial with the fixed barrel and includes a rotor rotating about the center axis of the fixed barrel; and a converting mechanism for converting a rotating motion of the rotor to a straight-ahead motion along a direction parallel to an optical axis of the lens frame. Furthermore, preferably, the converting mechanism includes a cam barrel connected to the rotor, and a cam pin provided to the lens frame.

With the above structure, the lens barrel according to the present invention can be applied to a lens barrel capable of moving a lens group by an electromagnetic motor.

The objects of the present invention can be achieved by an image pickup device that outputs an electrical image signal representing an image of a subject, including: an image pickup optical system including a predetermined lens group for forming the optical image of the subject; an image pickup sensor for receiving the optical image formed by the image pickup optical system and converting the optical image to the electrical image signal; and a lens barrel for holding an entire or part of the lens group of the image pickup optical system, wherein the lens barrel includes: a fixed barrel having an approximately cylindrical shape; a lens frame disposed inside of the fixed barrel for holding the lens group; at least one shaft engaging in the lens frame for guiding the lens frame in a direction parallel to the optical axis of the lens group; and a rotation regulating portion provided to a perimeter of the lens frame for regulating a rotation of the lens frame about the shaft, the lens frame is disposed in the fixed barrel so that a center axis of the fixed barrel and the optical axis of the lens group do not coincide with each other, but are deflected in parallel, and the shaft and the rotation regulating portion are disposed so that a central angle formed with respect to the center axis of the fixed barrel is less than 180 degrees.

With the above structure, in the image pickup device according to the present invention, the inside of the fixed barrel can be made compact compared with the case where the center axis of the fixed barrel and the optical axis coincide with each other. The image pickup device according to the present invention is compact in size in a direction perpendicular to the optical axis.

The objects of the present invention can be achieved by an image pickup device that outputs an electrical image signal representing an image of a subject, including: an image pickup optical system including a predetermined lens group for forming the optical image of the subject; an image pickup sensor for receiving the optical image formed by the image pickup optical system and converting the optical image to the electrical image signal; and a lens barrel for holding an entire or part of the lens group of the image pickup optical system, wherein the lens barrel includes: a lens frame disposed inside of the fixed barrel for holding the lens group; an electromagnetic motor for causing the lens frame to move along an optical axis of the image pickup optical system; at least one shaft engaging in the lens frame for guiding the lens frame in a direction parallel to an optical axis of the lens group; and a rotation regulating portion provided to a perimeter of the lens frame for regulating a rotation of the lens frame about the shaft, the electromagnetic motor includes a magnetic circuit that is rotationally symmetric about a symmetry axis parallel to the optical axis, the lens frame is disposed in the fixed barrel so that the symmetry axis of the magnetic circuit and the optical axis of the lens group do not coincide with each other, but are deflected in parallel, and the shaft and the rotation regulating portion are disposed so that a central angle formed with respect to the symmetry axis of the magnetic circuit is less than 180 degrees.

With the above structure, in the image pickup device having the electromagnetic motor for driving the lens group according to the present invention, the inside of the fixed barrel can be made compact compared with the case where the symmetry axis of the magnetic circuit and the optical axis coincide with each other. The image pickup device according to the present invention is compact in size in a direction perpendicular to the optical axis.

Preferably, the lens barrel includes a cylindrical fixed barrel, the electromagnetic motor includes a cylindrical rotor with the lens frame disposed therein, and the magnetic circuit includes a coil provided to either one of a stator provided the fixed frame and the rotor, and a magnet provided to another one of the stator and the rotor. Furthermore, preferably, the magnetic circuit includes a coil wound about a perimeter of the lens frame, and a magnet disposed outside of the lens frame.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
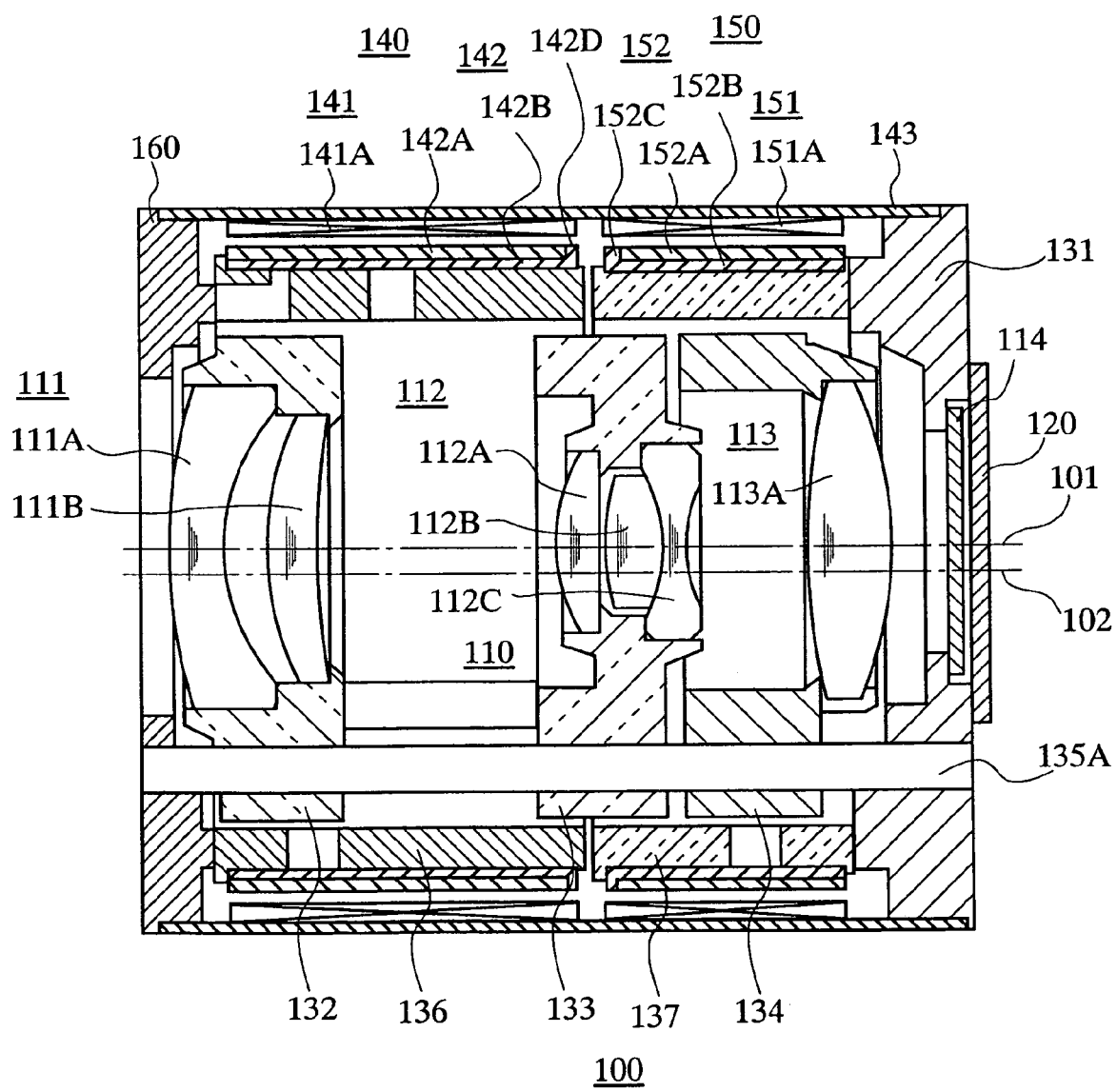
FIG. 1 is a longitudinal section view of an image pickup device according to a first embodiment of the present invention.

FIG. 1 is a longitudinal section view of an image pickup device according to a first embodiment of the present invention. In FIG. 1, an image pickup device 100 includes an optical system 110, an image pickup sensor 120, and a lens barrel 130.

The optical system 110 includes, from a subject side (at left in the drawing) to an image side (at right in the drawing) along an optical axis 101, a first zoom lens group 111, a second zoom lens group 112, a focus lens group 113, and a low-pass filter 114. The optical system 110 forms an optical image of the subject on the image pickup sensor 120.

The first zoom lens group 111 and the second zoom lens group 112 move along the optical axis 101 so as to vary a space therebetween, thereby zooming in or out the optical image of the subject, that is, varying scaling of the optical image. The first zoom lens group 111 includes a lens element 111A and a lens element 111B. The second zoom lens group 112 includes a lens element 112A, a lens element 112B, and a lens element 112C.

The focus lens group 113 moves along the optical axis 101 to perform focusing so as to adjust an in-focus state of the optical image of the subject. The focus lens group 113 includes one lens element 113A.

The low-pass filter 114 has an optical characteristic of cutting a predetermined spatial frequency from the optical image of the subject. Based on this optical characteristic, the low-pass filter 114 reduces false color and moiré of the optical image of the subject.

The image pickup sensor 120 is typically a CCD. The image pickup sensor 120 converts the optical image formed by the optical system 110 into an electrical image signal for output. The image pickup sensor 120 may be a CMOS.

The lens barrel 130 includes a board 131, a first lens frame 132, a second lens frame 133, a third lens frame 134, a guide shaft 135A, a guide shaft 135B, a zoom-cam barrel 136, a focus-cam barrel 137, a zoom motor 140, a focus motor 150, and a front cover 160. Also, the lens barrel 130 includes three bearing shafts 135C, 135D, and 135E, which are not shown in FIG. 1.

Figure 2:
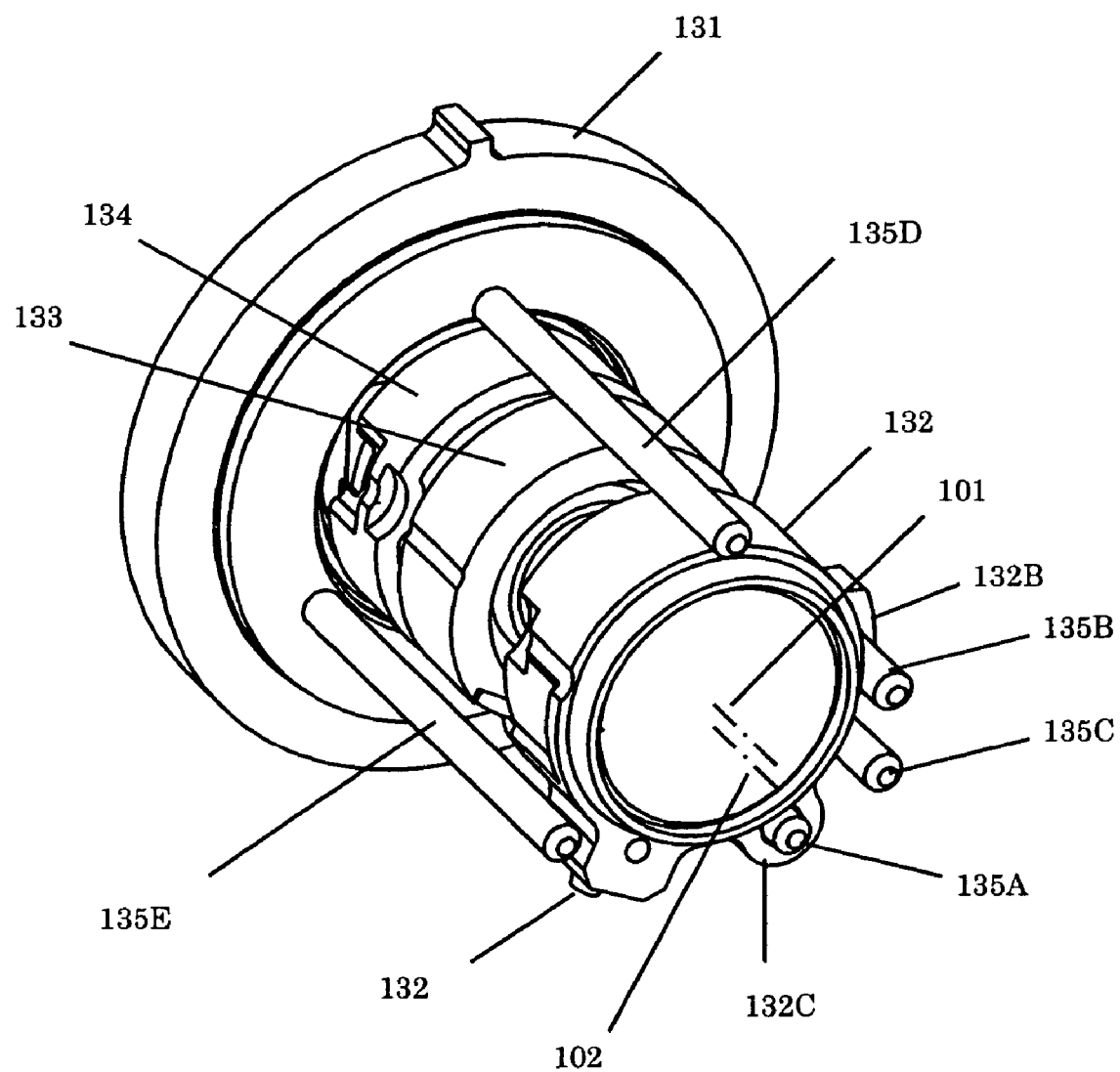
FIG. 2 is a perspective view showing a part of the image pickup device according to the first embodiment of the present invention.

FIG. 2 is a perspective view showing a part of the image pickup device according to the first embodiment of the present invention. FIG. 2 shows the structure of the image pickup device 100 from which the zoom-cam barrel 136, the focus-cam barrel 137, the zoom motor 140, the focus motor 150, and the front cover 160 are removed.

In FIGS. 1 and 2, the board 131 has a disk-like shape perpendicular to the optical axis 101. The board 131 has a rectangular opening at the center, and supports, in the order closest from the subject side, the low-pass filter 114 and the image pickup sensor 120. Also, the board 131 supports the guide shafts 135A and 135B and the bearing shafts 535C through 535E.

The first lens frame 132 supports the first zoom lens group 111. The first lens frame 132 has an approximately cylindrical shape with the optical axis 101 being taken as a center axis. The first lens frame 132 is provided on its perimeter with a cam pin 132A, a rotation regulating portion 132B, and a through hole 132C facing in a direction parallel to the optical axis 101. The cam pin 132A engages in a cam groove, not shown, provided to the zoom-cam barrel 136. The rotation regulating portion 132B engages in the guide shaft 535B with subtle play formed in a direction perpendicular to the optical axis 101. The guide shaft 135A is fitted in the through hole 132C.

The second lens frame 133 holds the second zoom lens group 112. The second lens frame 133 has an approximately cylindrical shape with the optical axis 101 being taken as a center axis. The second lens frame 133 is similar in structure to the first lens frame 132. That is, the second lens frame 133 is provided on its perimeter with a cam pin (not shown) protruding in an outer surface direction, a rotation regulating portion (not shown), and a through hole (not shown) facing to a direction parallel to the optical axis 101. The cam pin engages with a cam groove, not shown, provided to the zoom-cam barrel 136. The rotation regulating portion engages in the guide shaft 135B. The through hole is used to hold the guide shaft 135A by allowing penetration.

The third lens frame 134 holds the focus lens group 113. The third lens frame 134 has an approximately cylindrical shape. The third lens frame 134 is similar in structure to the first lens frame 132. That is, the third lens frame 134 is provided on its perimeter with a cam pin (not shown) protruding in an outer surface direction, a rotation regulating portion (not shown), and a through hole (not shown) facing to a direction parallel to the optical axis 101. The cam pin engages in a cam groove, not shown, provided to the focus-cam barrel 137. The rotation regulating portion engages in the guide shaft 135B. The through hole is used to hold the guide shaft 135A by allowing penetration.

The zoom-cam barrel 136 and the focus-cam barrel 137 each have a cylindrical shape. The zoom-cam barrel 136 and the focus-cam barrel 137 have a center axis 102 shared in common, and can rotate about this center axis 102. The center axis 102 is at the center of a circumscribed circle formed by the three bearing shafts 535C through 535E on a plane perpendicular to the optical axis. That is, the three bearing shafts 535C through 535E serve as a rotation axis bearing of the zoom-cam barrel 136 and the focus-cam barrel 137. Here, the optical axis 101 of the image pickup optical system 110 does not coincide with the center axis 102. The relation between the optical axis 101 and the center axis 102 will be described further below.

Around the perimeter of the zoom-cam barrel 136 and the focus cam barrel 137, a zoom motor 140 and a focus motor 150 are provided. The zoom motor 140 includes a stator 141 and a rotor 142. The stator 541 includes a lens body 143 serving as a stator yoke, and stator coil 141A. The rotor 142 includes a rotor magnet 142A and a rotor yoke 142B. The rotor yoke 142B has a flange portion 142D for reducing a magnetic flux leaked from the edge of the rotor magnet 142A.

The focus motor 150 includes a stator 151 and a rotor 152. The stator 151 includes the lens body 143 serving as a stator yoke shared by the zoom motor 140 and a stator coil 151A. The rotor 152 includes a rotor magnet 152A and a rotor yoke 152B. The rotor yoke 152B has a flange portion 152C for reducing a magnetic flux leaked from the edge of the rotor magnet 152A.

Figure 3:
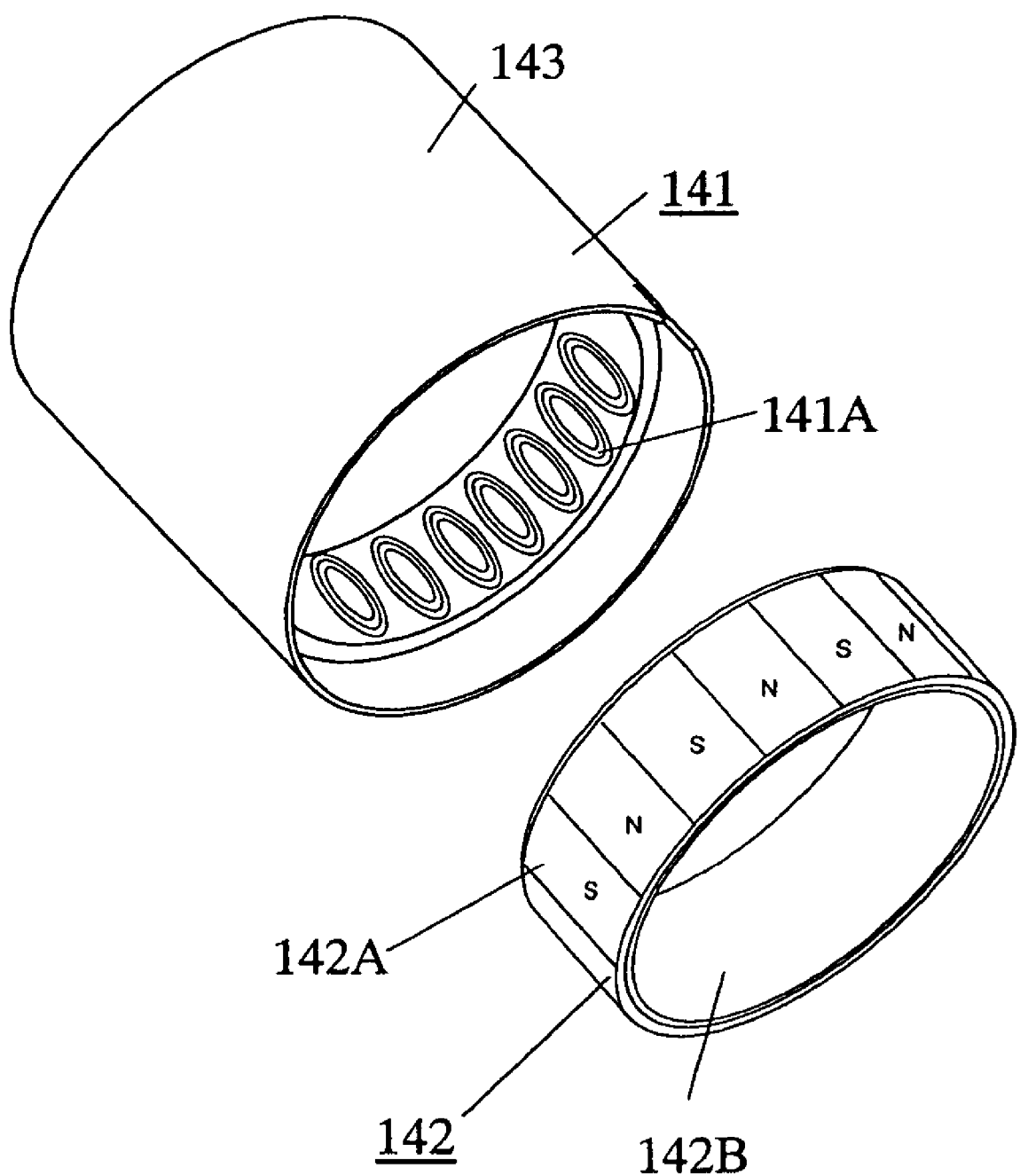
FIG. 3 is an exploded perspective view of a zoom motor of the image pickup device according to the first embodiment of the preset invention.

FIG. 3 is an exploded perspective view of the zoom motor of the image pickup device according to the first embodiment of the preset invention. In FIGS. 1 and 3, the lens body 143 has a cylindrical shape formed about the center axis 102. The lens body 143 is typically implemented by a ferromagnetic body, such as an flat-rolled magnetic steel sheet, and is a fixed barrel held by the board 131 and the front cover 160, which will be described further below.

The stator coil 141A fixed to the inner surface of the lens body 143 is formed so that a plurality of spirally-wound small coils are disposed at a predetermined pitch along the inner surface of the lens body 143. The rotor magnet 142A is typically implemented by a permanent magnet having magnetic poles as many as the number of small coils of the stator coil 141A. The magnetic poles are disposed in a manner such that N poles and S poles are alternately disposed along the perimeter of the rotor yoke 142B. The rotor yoke 142B is typically implemented by a ferromagnetic body, such as a flat-rolled magnetic steel sheet, and is disposed between the rotor magnet 142A and the zoom-cam barrel 136.

The lens body 143 serving as a stator yoke, the stator coil 141A, the rotor magnet 142A, and the rotor yoke 142B form a magnetic circuit. In the zoom motor 140, the magnetic circuit is driven by an electric current externally applied at a predetermined timing to the small coils of the stator coil 141A, thereby causing the rotor magnet 142A and the rotor yoke 142B to rotate and serve as an electromagnetic motor.

The focus motor 150 has a structure similar to that of the zoom motor 140 shown in FIG. 3.

That is, the stator coil 151A fixed to the inner surface of the lens body 143 is formed so that a plurality of spirally-wound small coils are disposed at a predetermined pitch along the inner surface of the lens body 143. The rotor yoke 152B is adhered to the outer surface of the focus-cam barrel 137. The rotor yoke 152B is typically formed of a ferromagnetic body, such as a flat-rolled magnetic steel sheet.

The rotor magnet 152A is adhered to the perimeter of the rotor yoke 152B. The rotor magnet 152A is typically implemented by a permanent magnet having magnetic poles as many as the number of small coils of the stator coil 151A. The magnetic poles are disposed in a manner such that N poles and S poles are alternately disposed along the perimeter of the rotor yoke 152B.

The stator 151 including the lens body 143 serving as a stator yoke and the stator coil 151A, the rotor magnet 152A, and the rotor yoke 152B form a magnetic circuit of the focus motor 150. In the focus motor 150, the magnetic circuit is driven by a current externally applied at a predetermined timing to the small coils of the stator coil 151A, thereby causing the rotor magnet 142A and the rotor yoke 142B to rotate and serve as an electromagnetic motor.

In FIG. 1, the front cover 160 has a disk shape perpendicular to the optical axis 101. The front cover 160 is fixed to a side of the image pickup device 100 closest to the subject. The front cover 160 has a through hole for supporting the guide shafts 135A and 135B.

One edge of the lens body 143 on the subject side is supported by the front cover 160. The other edge of the lens body 143 on the image side is supported by the board 131. With the lens body 143 being supported by the front cover 160 and the board 131, the space between the stator coil 141A and the rotor magnet 142A and the space between the stator coil 151A and the rotor magnet 152A are appropriately maintained.

In the above-described structure, when zooming is performed, a driving current is externally applied to the small coils of the stator coil 141A of the zoom motor 140 at a predetermined timing. With the driving current being applied, the magnetic circuit is driven to cause the rotor 142 to rotate about the center axis 102.

With the rotor 142 rotating about the center axis 102, the zoom-cam barrel 136 rotates about the center axis 102. With the zoom-cam barrel 136 rotating about the center axis 102, the cam pin 132A provided on the first lens frame 132 is guided along the cam groove in which the cam pin 132A is fitted. Also, with the zoom-cam barrel 136 rotating about the optical axis, the cam pin provided on the second lens frame 133 is guided along the cam groove in which the cam pin is fitted.

The first lens frame 132 is guided by the guide shaft 135A so as to move in a direction parallel to the optical axis 101. At this time, since the rotation regulating portion 132B engages in the guide shaft 135B, the first lens frame 132 is regulated so as not to freely rotate about the guide shaft 135A on a plane perpendicular to the optical axis 101. Therefore, when the zoom-cam barrel 136 rotates about the optical axis, the rotating motion is converted to a straight-ahead motion, thereby causing the first lens frame 132 to move in a direction parallel to the optical axis in accordance with the phase of the cam groove. That is, the cam groove of the zoom-cam barrel 136 and the cam pin 132A of the first lens frame 532 form a converting mechanism.

Also, similarly, with the engagement of the rotation regulating portion and the guide shaft 135B, the second lens frame 133 is regulated so as not to freely rotate about the guide shaft 135A on a plane perpendicular to the optical axis 101. Therefore, when the zoom-cam barrel 136 rotates about the optical axis, the rotating motion is converted to a straight-ahead motion, thereby causing the second lens frame 133 to move in a direction parallel to the optical axis in accordance with the phase of the cam groove.

With the first lens frame 132 and the second lens frame 133 moving, the first zoom lens group 111 and the second zoom lens group 112 move, while changing a space therebetween, to each predetermined position in a direction parallel to the optical axis. As a result, the image pickup device 100 can perform zooming.

When focusing is performed, a driving current is externally applied to the small coils of the stator coil 151A of the focus motor 150 at a predetermined timing. With the driving current being applied, an electromagnetic force occurs in the magnetic circuit, thereby causing the rotor 152 to rotate about the optical axis.

With the rotor 152 rotating about the optical axis, the focus-cam barrel 137 also rotates about the optical axis. With the focus-cam barrel 137 rotating about the optical axis, the cam pin provided on the third lens frame 134 is guided along the cam groove in which the cam pin is fitted.

With the engagement of the rotation regulating portion and the guide shaft 135B, the third lens frame 134 is regulated so as not to freely rotate about the guide shaft 135A on a plane perpendicular to the optical axis 101. Therefore, when the focus-cam barrel 137 rotates about the optical axis, the rotating motion is converted to a straight-ahead motion, thereby causing the third lens frame 134 to move in a direction parallel to the optical axis in accordance with the phase of the cam groove.

Figure 4:
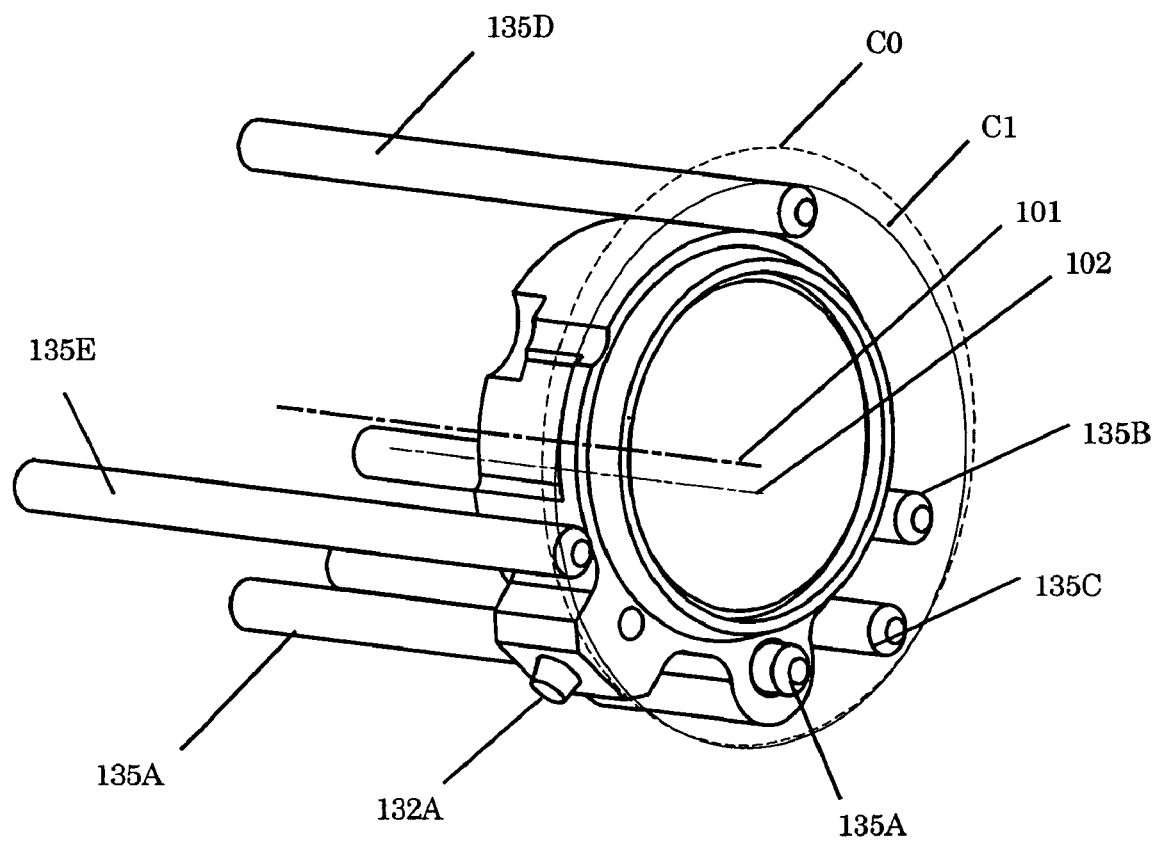
FIG. 4 is a perspective view of a lens barrel of the image pickup device according to the first embodiment of the present invention for describing a positional relation among a first lens frame, two guide shafts, and three bearing shafts.
Figure 5:
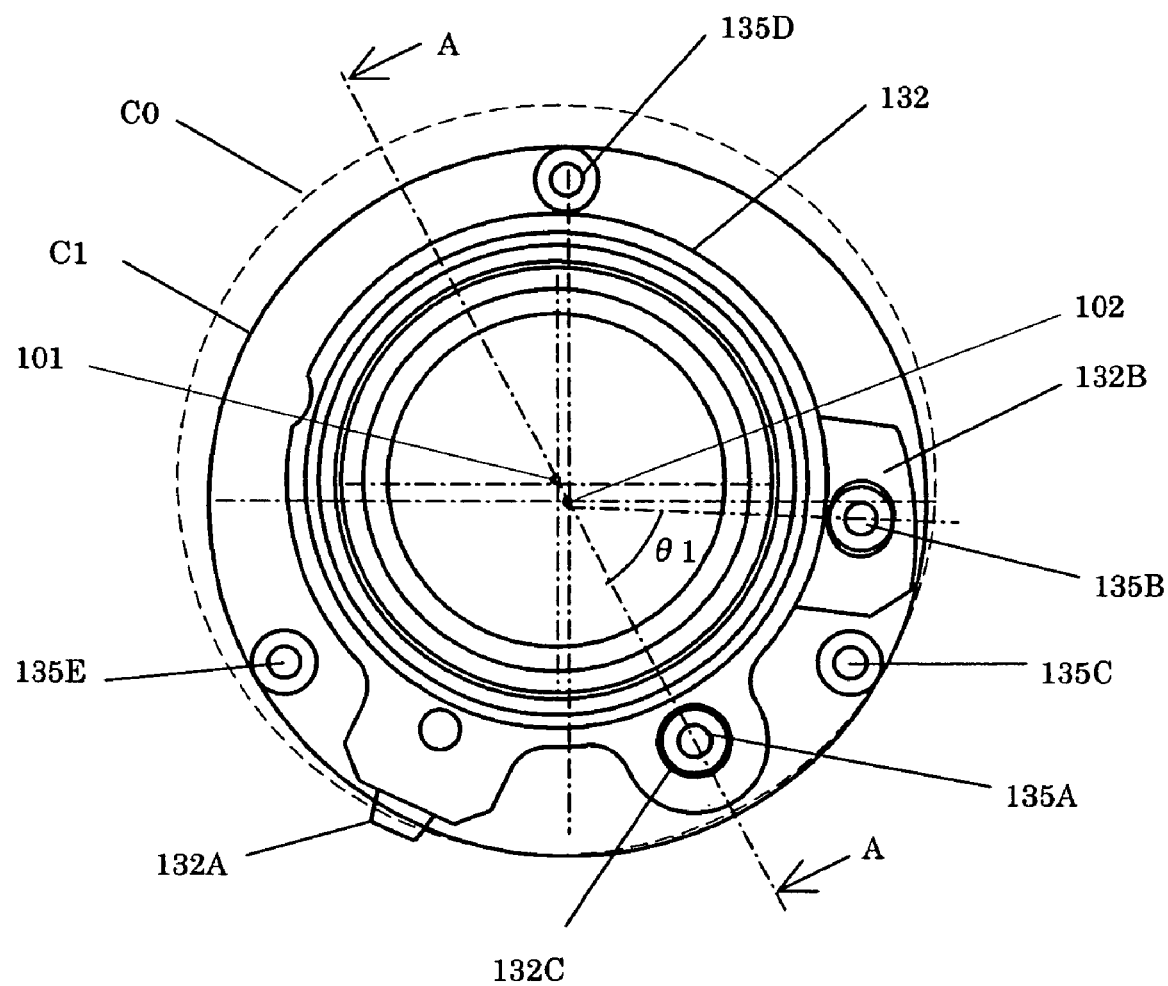
FIG. 5 is a front view of the lens barrel of the image pickup device according to the first embodiment of the present invention for describing the positional relation among the first lens frame, the two guide shafts, and the three bearing shafts.

FIG. 4 is a perspective view of the lens barrel of the image pickup device according to the first embodiment of the present invention for describing a positional relation among the first lens frame, the two guide shafts, and the three bearing shafts. FIG. 5 is a front view of the lens barrel of the image pickup device according to the first embodiment of the present invention for describing the positional relation among the first lens frame, the two guide shafts, and the three bearing shafts. Note that, in FIG. 5, an A-A section corresponds to the section view in FIG. 1.

In FIGS. 4 and 5, the three bearing shafts 135C through 135E define a circumscribed circle C1. The circumscribed circle C1 has a diameter corresponding to the inner diameter of the zoom-cam barrel 136. On the other hand, a virtual circle C0 has a diameter corresponding to the inner diameter of a zoom-cam barrel required when the optical axis 101 coincides with the center axis 102 of the lens body 143, which is a fixed barrel, by taking a point of contact of the bearing shaft 135C as a reference.

As can be seen from FIGS. 4 and 5, in the lens barrel according to the first embodiment, the diameter of the circumscribed circle C1 is shorter than the diameter of the virtual circle C0. That is, in the lens barrel according to the first embodiment, the optical axis 101 and the center axis 102 of the lens body 143, which is a fixed barrel, do not coincide with each other, but are deflected from each other in parallel. With this, the front surface of the zoom-cam barrel 136 can be made compact.

Also, in the lens barrel according to the first embodiment, a central angle θ1 formed by the guide shaft 135A and the guide shaft 535B engaging in the rotation regulating portion 132B, and the center axis 102 is less than 180 degrees. Therefore, a deflection amount between the optical axis 101 and the center axis 102 of the lens body 143, which is a fixed barrel, is significantly large. Therefore, the front surface of the zoom-cam barrel 136 can be made compact compared with that of the conventional lens barrel, particularly in a direction perpendicular to the optical axis.

With the zoom-cam barrel 136 being made small, the fixed barrel and other components disposed on the perimeter of the zoom-cam barrel 136 can also be made small. Therefore, the entire lens barrel can be downsized. Also, in the lens barrel according to the first embodiment, the central angle θ1 formed by the guide shaft 135A and the guide shaft 135B engaging in the rotation regulating portion 132B, and the center axis 102 is less than 90 degrees. Therefore, a deflection amount is significantly large.

Also, the center axis 102 is a symmetry axis of the magnetic circuit formed by the lens body 143, the stator coil 141A, the rotor magnet 142A, and the rotor yoke 142B. In the lens barrel according to the first embodiment, the optical axis 101 and the center axis 102 of the magnetic circuit forming the driving electromagnetic motor do not coincide with each other, but are deflected from each other in parallel. With this, in the structure including the driving electromagnetic motor, the front surface of the zoom-cam barrel 136 can be made compact.

Second Embodiment

Figure 6:
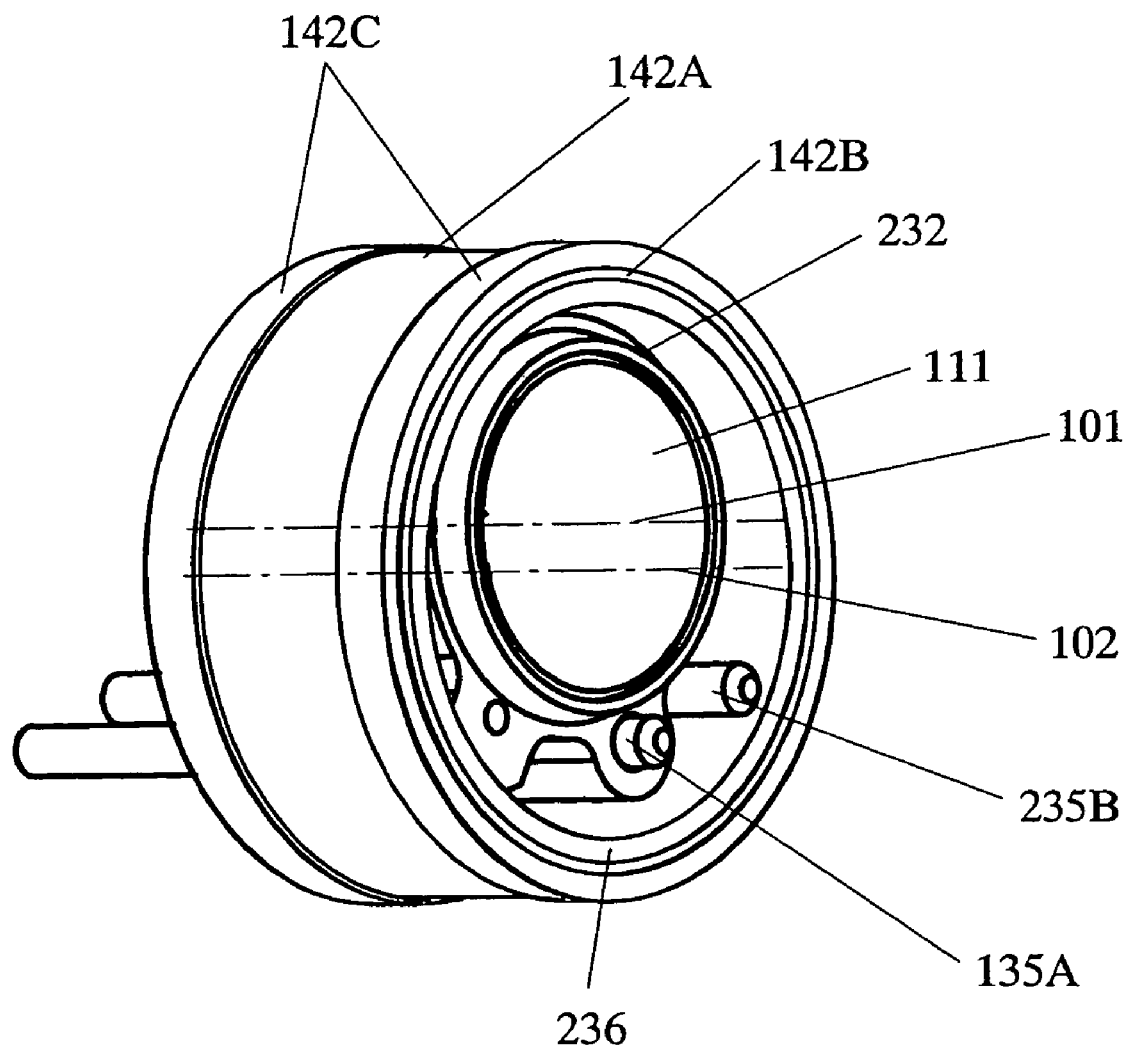
FIG. 6 is a perspective view showing a part of an image pickup device according to a second embodiment of the present invention.
Figure 7:
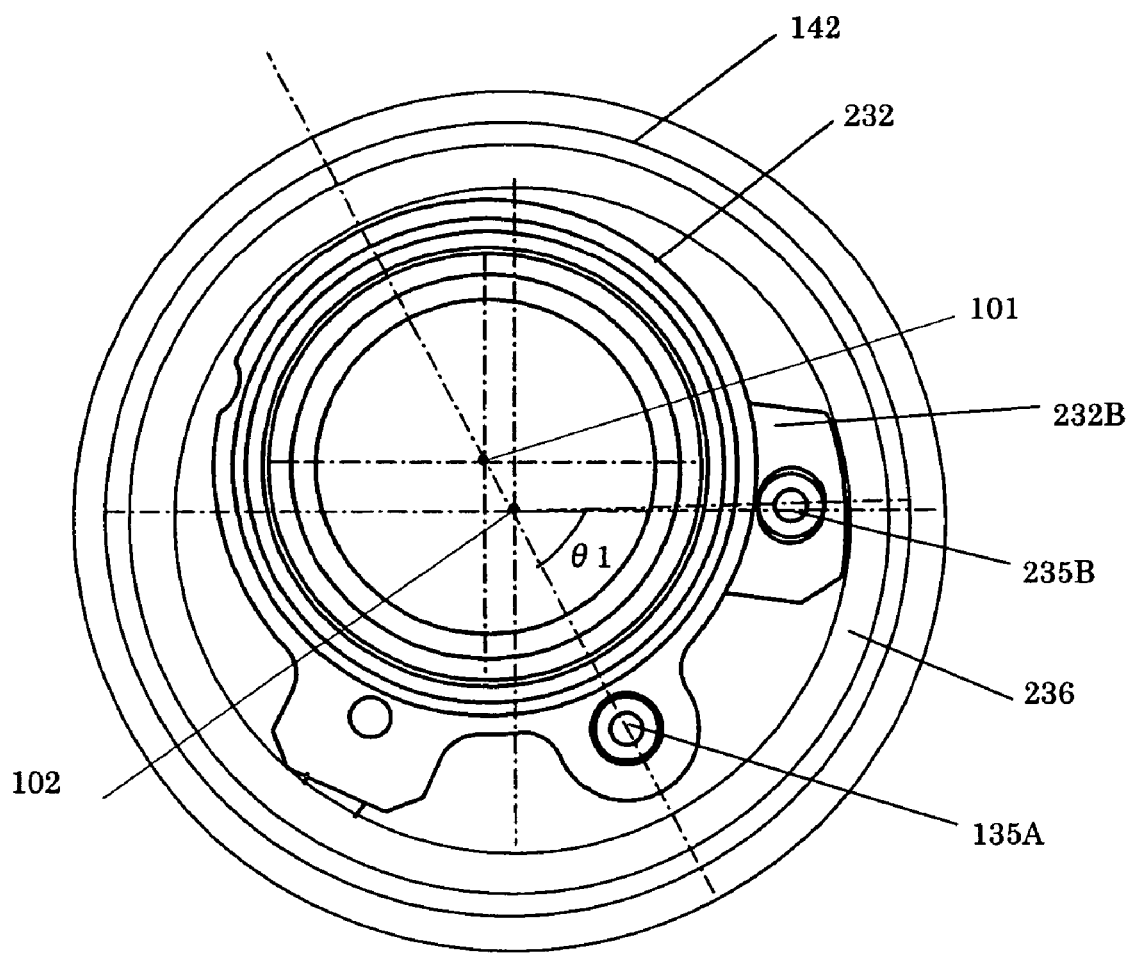
FIG. 7 is a front view showing the part of the image pickup device according to the second embodiment of the present invention.

FIG. 6 is a perspective view showing a part of an image pickup device according to a second embodiment of the present invention. FIG. 7 is a front view showing the part of the image pickup device according to the second embodiment of the present invention. A lens barrel according to the second embodiment is similar in structure to the lens barrel 130 according to the first embodiment. Therefore, description is made mainly to different features. FIG. 6 is a perspective view of a structure on the periphery of a first lens frame 232 for holding the first zoom lens group 111. FIG. 7 is a front view of the structure shown in FIG. 6.

The first lens frame 232 holds the first zoom lens group 111. The first lens frame 232 has an approximately-cylindrical shape with the optical axis 101 being taken as a center axis. The first lens frame 232 is provided on its edge with a cam pin 232A protruding in an outer surface direction, a rotation regulating portion 232B, and a through hole 232C penetrating therethrough in a direction parallel to the optical axis 101. The cam pin 232A engages in a cam groove, not shown, provided to a zoom-cam barrel 236. The rotation regulating portion 232B engages in a guide shaft 235B with subtle play formed in a direction perpendicular to the optical axis 101. The guide shaft 135A is fitted in the through hole 232C.

The zoom-cam barrel 236 has a cylindrical shape. The zoom-cam barrel 236 has fixed to its perimeter the rotor yoke 142B, and to further its perimeter the rotor magnet 142A. The rotor magnet 142A and the rotor yoke 142B, together with the lens body 143 and the stator coil 141A described in the first embodiment, form a magnetic circuit of the zoom motor 140. Also, at each edge of the rotor magnet 142A in a direction parallel to the optical axis 101, a bearing portion 142C that slides in an external hollow bearing is formed. Unlike the lens barrel 130 according to the first embodiment in which the zoom-cam barrel is rotatably held by three bearing shafts 135C through 135E, the zoom-cam barrel 236 is held by the external hollow bearing, not shown, typically via the rotor yoke 142B so as to be rotatable about the center axis 102.

In the image pickup device to which the lens barrel according to the second embodiment, when the zoom motor 140 is driven so as to cause the zoom-cam barrel 236 to rotate, the first lens frame 232 moves in a direction parallel to the optical axis 101, thereby causing the first zoom lens group 111 to move along the optical axis 101.

Figure 8:
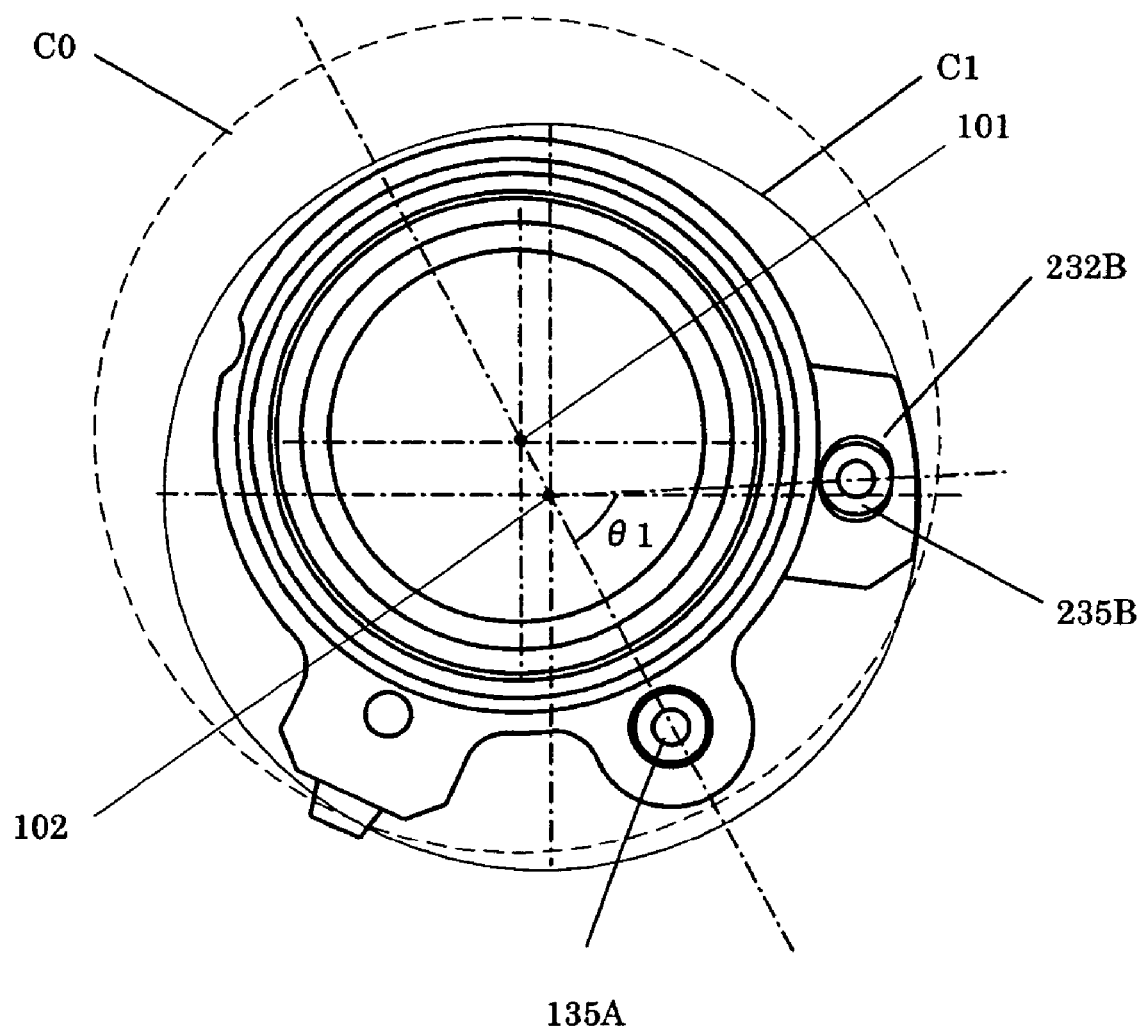
FIG. 8 is a front view of the image pickup device according to the second embodiment of the present invention for describing a positional relation among a first lens frame and two guide shafts.

FIG. 8 is a front view of the image pickup device according to the second embodiment of the present invention for describing a positional relation among the first lens frame and two guide shafts. In FIG. 8, a circle C1 has a diameter corresponding to the inner diameter of the zoom-cam barrel 236. Also, a virtual circle C0 has a diameter corresponding to the inner diameter of a zoom-cam barrel required when the optical axis 101 coincides with the center axis 102 of the lens body 143, which is a fixed barrel, by taking a point of contact of the guide shaft 235B as a reference.

As can be seen from FIG. 8, in the lens barrel according to the second embodiment, the diameter of the circle C1 is shorter than the diameter of the virtual circle C0. That is, in the lens barrel according to the second embodiment, the optical axis 101 and the center axis 102 of the lens body 143, which is a fixed barrel, do not coincide with each other, but are deflected from each other in parallel. With this, the front surface of the zoom-cam barrel 236 can be made compact.

Also, in the lens barrel according to the second embodiment, a central angle θ1 formed by the guide shaft 135A and the guide shaft 235B engaging in the rotation regulating portion 232B, and the center axis 102 is less than 180 degrees. Therefore, a deflection amount between the optical axis 101 and the center axis 102 of the lens body 143, which is a fixed barrel, is significantly large. Therefore, the front surface of the zoom-cam barrel 236 can be made compact compared with that of the conventional lens barrel.

As the lens barrel according to the second embodiment, with the zoom-cam barrel 236 being made small, the fixed barrel and other components disposed on the perimeter of the zoom-cam barrel 236 can also be made small. Therefore, the entire lens barrel can be downsized. Also, in the lens barrel according to the second embodiment, the central angle θ1 formed by the guide shaft 135A and the guide shaft 235B engaging in the rotation regulating portion 232B, and the center axis 102 is less than 90 degrees. Therefore, a deflection amount is significantly large.

Figure 11:
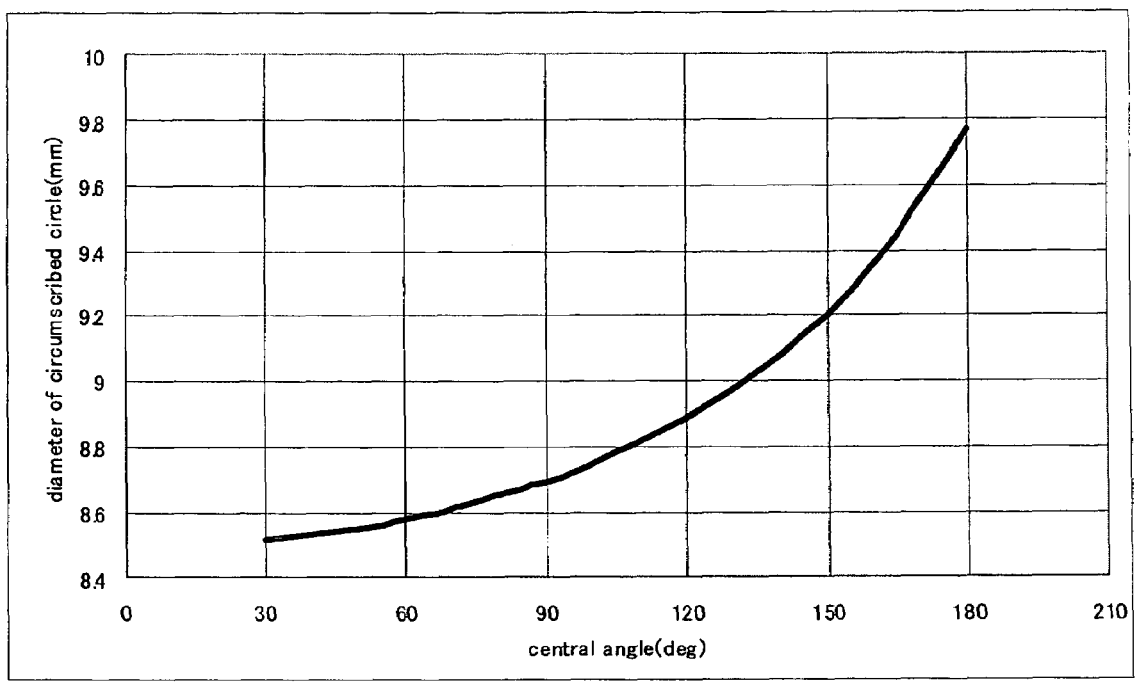
FIG. 11 is graph which shows a relation between the diameter of the circumscribed circle C1 equivalent to inner surface of a zoom cam barrel and the central angle θ1 in the lens barrel of the second embodiment.

FIG. 11 is graph which shows a relation between the diameter of the circumscribed circle C1 equivalent to inner surface of a zoom cam barrel and the central angle θ1 in the lens barrel of the second embodiment. In FIG. 11, the vertical axis of graph expresses the diameter of the circumscribed circle, and a horizontal axis expresses the central angle θ1. As shown in FIG. 11 and the central angle θ1 becomes smaller, the diameter of a circle C1 is smaller. Therefore, when the central angle θ1 is less than 180 degrees, it can make the circumscribed circle C1 small. However, when the balance between the miniaturization of a lens barrel and the effect of rotation regulation is taken into consideration, as for a central angle, it is desirable that it is less than 150 degrees, and it is especially desirable that it is less than 90 degrees.

Also, the center axis 102 is a symmetry axis of the magnetic circuit formed by the lens body 143, the stator coil 141A, the rotor magnet 142A, and the rotor yoke 142B. In the lens barrel according to the second embodiment, the optical axis 101 and the center axis 102 of the magnetic circuit forming the driving electromagnetic motor do not coincide with each other, but are deflected from each other in parallel. With this, in the structure including the driving electromagnetic motor, the front surface of the zoom-cam barrel 236 can be made compact.

Third Embodiment

Figure 9:
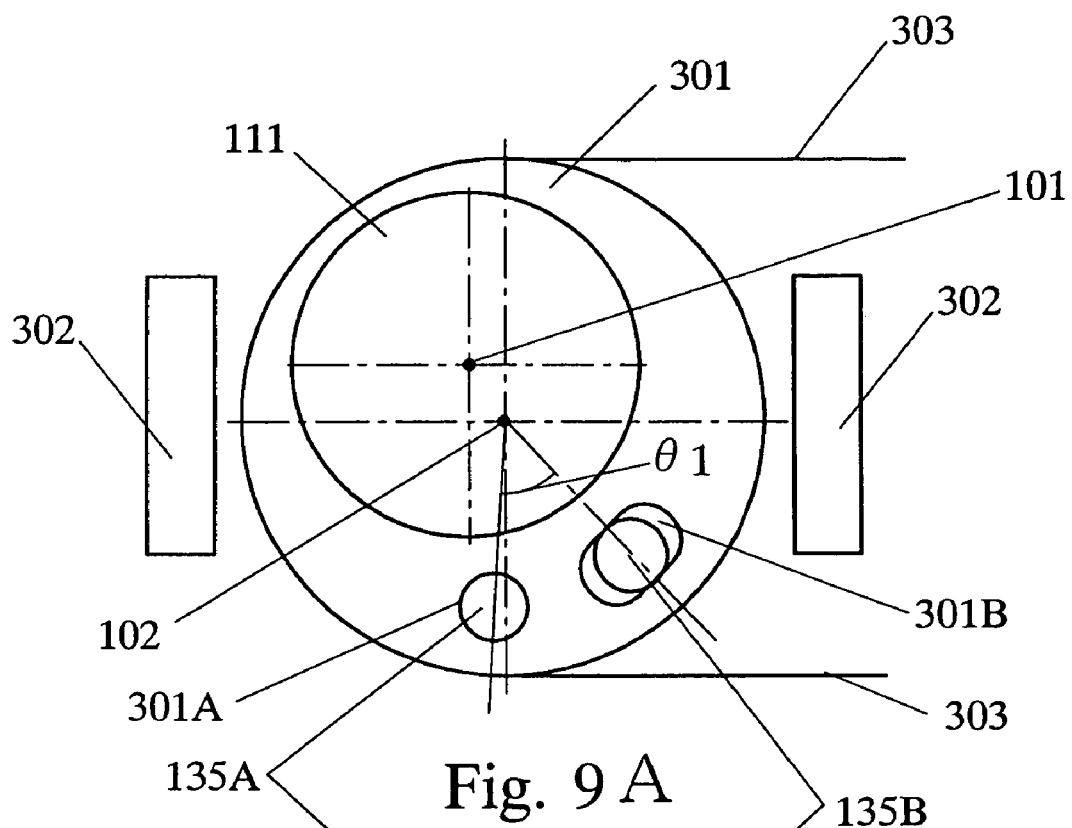
FIGS. 9A and 9B are schematic illustrations showing the structure of a lens barrel according to a third embodiment of the present invention.
Figure 9:
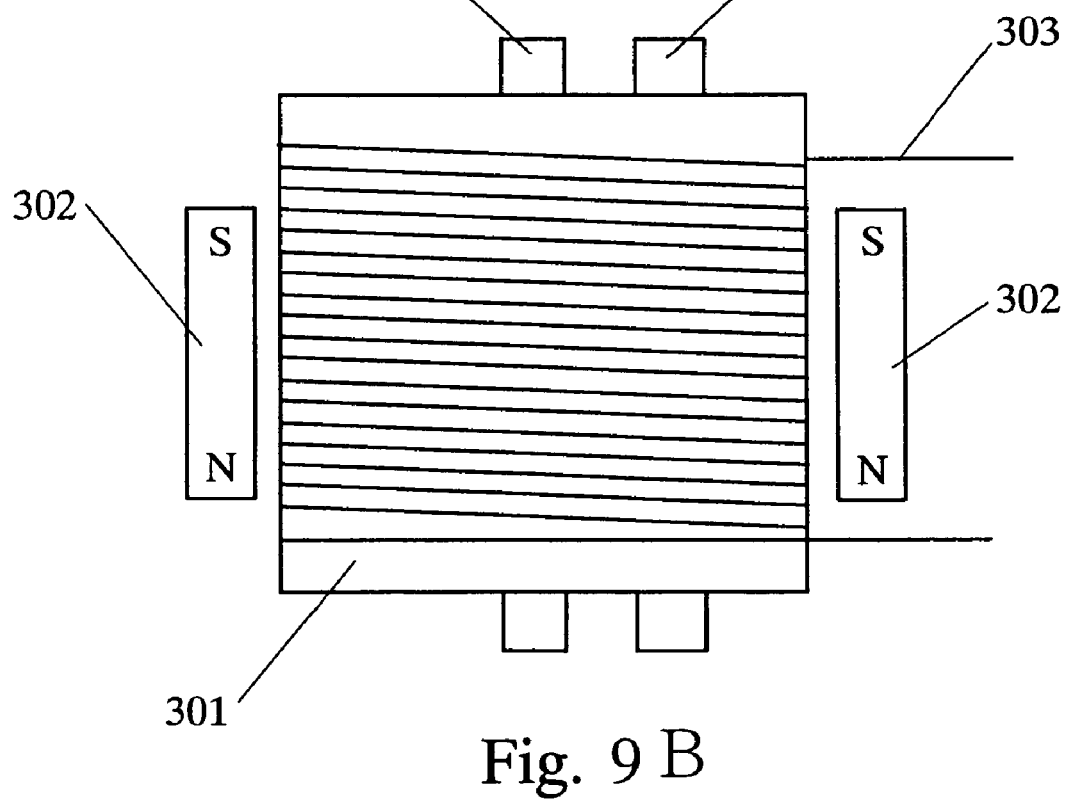

FIGS. 9A and 9B are schematic illustrations showing the structure of a lens barrel according to a third embodiment of the present invention, wherein FIG. 9A is a front view of the lens barrel and FIG. 9B is a plan view thereof. Unlike the lens barrel according to the second embodiment, the lens barrel according to the third embodiment uses a voice coil motor to drive a lens group.

In FIGS. 9A and 9B, a first lens frame 301 has a cylindrical shape. The first lens frame 301 has the first lens group 111 held therein. The optical axis of the first lens group 111 and the center axis of the first lens frame 301 do not coincide with each other, but are deflected from each other in parallel.

The first lens frame 301 has two through holes 301A and 301B provided in parallel to the optical axis 101. The guide shaft 135A is fitted in the through hole 301A, thereby guiding the first lens frame 132 in a direction parallel the optical axis. The guide shaft 135B engages in the through hole 301B (rotation regulating portion) with subtle play formed about the optical axis of the first lens frame 301. Also, a coil 303 is wound about the perimeter of the first lens frame 301. Furthermore, magnets 302 are disposed outside the first lens frame 301 with their magnetic poles being oriented to directions parallel to the optical axis. Therefore, the center axis 102 is a symmetry axis of a magnetic circuit formed by the coil 303 and the magnets 302.

In the above structure, when an electric current is externally supplied to the coil 303, an electromagnetic force occurs in the magnetic circuit, thereby driving the first lens frame 301 in a direction parallel to the optical axis 101 according to the direction of the electric current.

In the lens barrel according to the third embodiment, the optical axis 101 and the center axis 102 of the magnetic circuit forming a driving electromagnetic motor, do not coincide with each other, but are deflected from each other in parallel. With this, the entire first lens frame 301 is made compact. Particularly, in the lens barrel according to the third embodiment, a central angle θ1 formed by the guide shaft 235A and the guide shaft 235B engaging in the through hole 301B, and the center axis 102 is less than 180 degrees. Therefore, a deflection amount between the optical axis 101 and the center axis 102 is significantly large.

As such, with such a significantly large deflection amount between the optical axis 101 and the center axis 102, the first lens frame 301 itself can be particularly made compact compared with that of the conventional lens barrel. Also, the lens barrel according to the third embodiment does not require a cam barrel or a fixed barrel, and is therefore made quite compact in size. Furthermore, in the lens barrel according to the third embodiment, the central angle θ1 formed by the guide shaft 135A and the guide shaft 135B engaging in the through hole 301B, and the center axis 102 is less than 90 degrees. Therefore, a deflection amount is significantly large.

Fourth Embodiment

Figure 12:
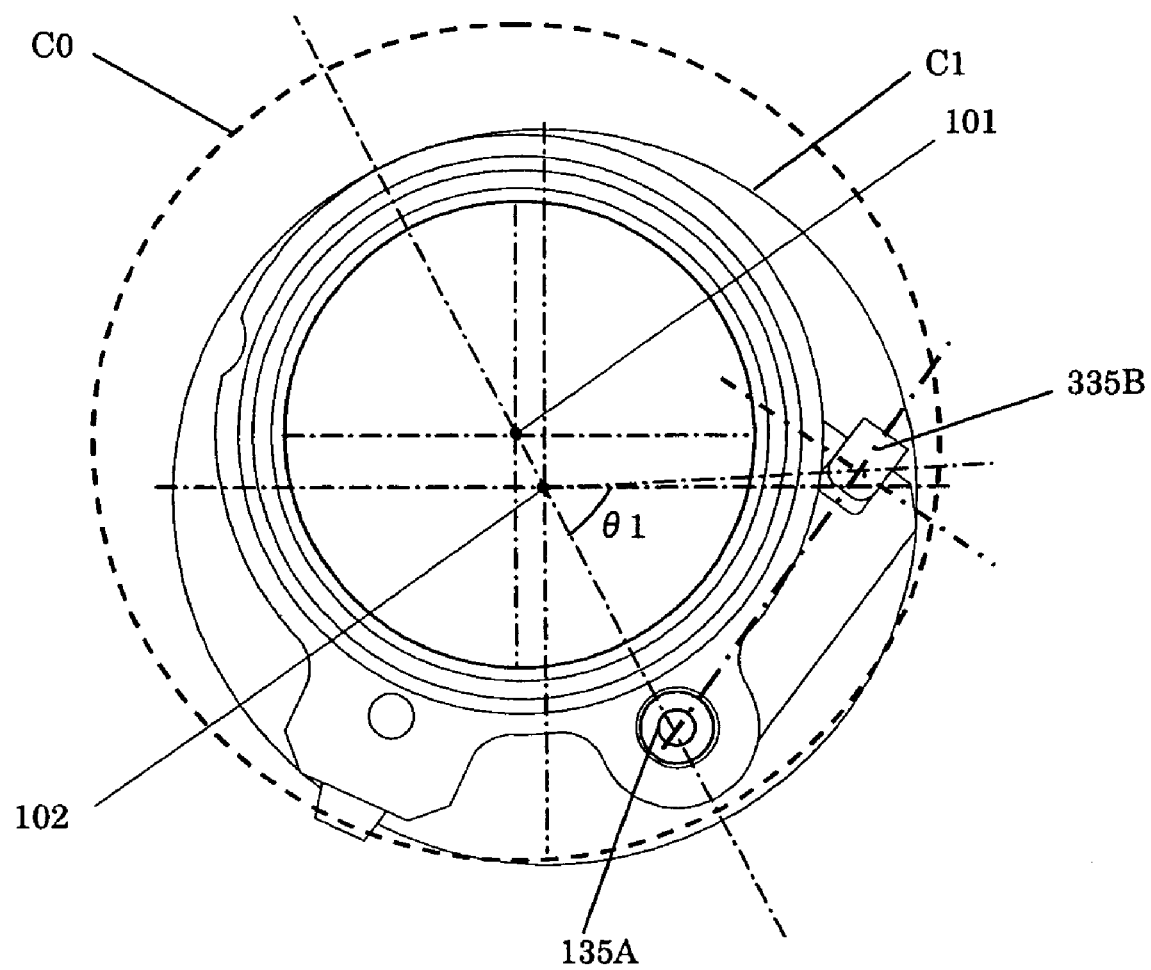
FIG. 12 is a front view of the lens barrel to the fourth embodiment of the present invention for describing a positional relation among the first lens frame and two guide shafts.

FIG. 12 is a front view of the lens barrel to the fourth embodiment of the present invention for describing a positional relation among the first lens frame and two guide shafts. A lens barrel according to the fourth embodiment is similar in structure to the lens barrel 130 according to the first embodiment. Therefore, description is made mainly to different features.

In FIG. 12, a circle C1 has a diameter corresponding to the inner diameter of the zoom-cam barrel (not shown). Also, a virtual circle C0 has a diameter corresponding to the inner diameter of a zoom-cam barrel required when the optical axis 101 coincides with the center axis 102 of the lens body, which is a fixed barrel. A rotation regulation portion 335B is fitted to the through hole provided in the fixed barrel side, and has the cylindrical shaft shape prolonging in the direction of the optical axis 101.

Figure 13:
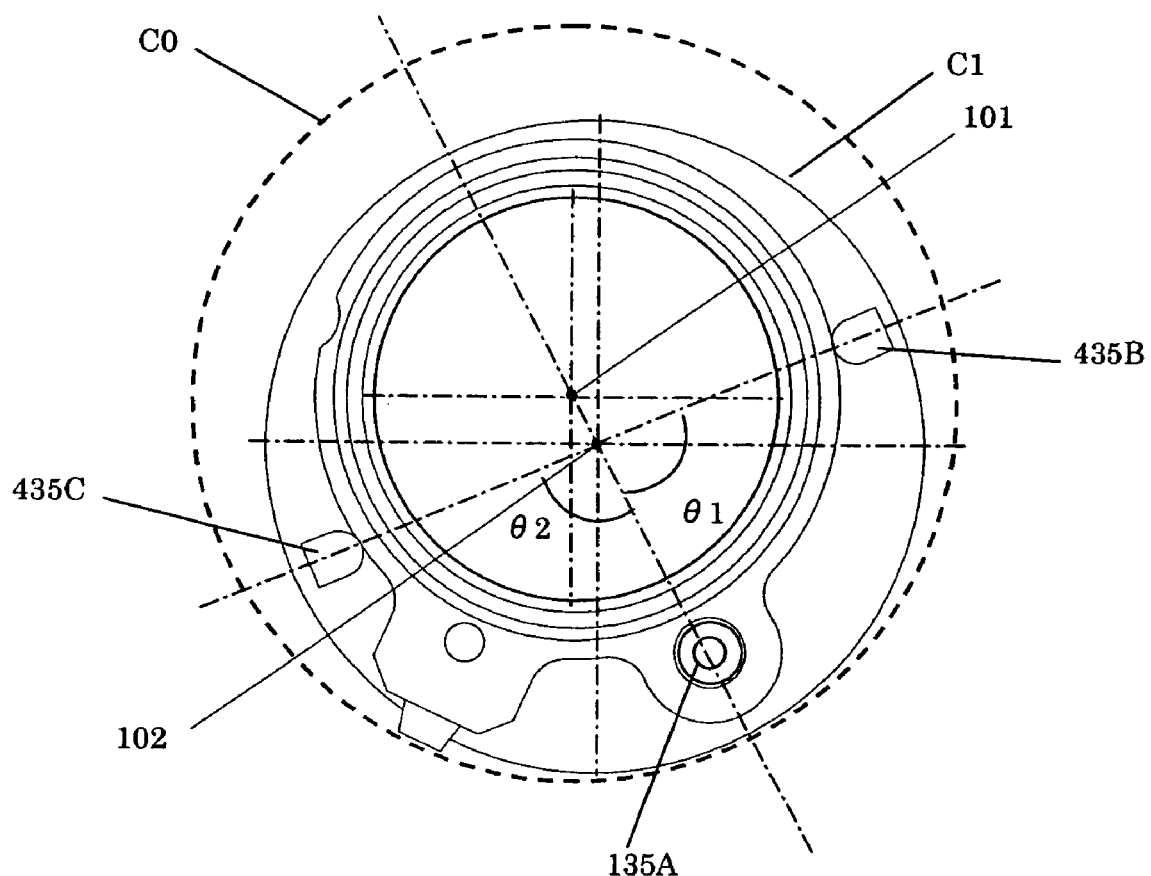
FIG. 13 is a front view of the lens barrel to the another example of the fourth embodiment of the present invention for describing a positional relation among the first lens frame and two guide shafts.

FIG. 13 is a front view of the lens barrel to the another example of the fourth embodiment of the present invention for describing a positional relation among the first lens frame and two guide shafts. The lens barrel of the example includes two rotation regulation portions 435B and 435C symmetrically arranged on both sides of the center axis 102 instead of rotation regulation portion 335B. The structure of each rotation regulation portion is identical to the rotation regulation portion 335B shown in FIG. 12.

As can be seen from FIGS. 12 and 13, in the lens barrel according to the second embodiment, the diameter of the circle C1 is shorter than the diameter of the virtual circle C0. That is, in the lens barrel according to the fourth embodiment, the optical axis 101 and the center axis 102 of the lens body, which is a fixed barrel, do not coincide with each other, but are deflected from each other in parallel. With this, the front surface of the zoom-cam barrel can be made compact.

Also, in the lens barrel according to the fourth embodiment, a central angle θ1 formed by the guide shaft 135A and the rotation regulating portion 435B, and the center axis 102 is less than 180 degrees. Therefore, a deflection amount between the optical axis 101 and the center axis 102 of the lens body, which is a fixed barrel, is significantly large. Therefore, the front surface of the zoom-cam barrel can be made compact compared with that of the conventional lens barrel.

In particular, in the lens barrel according to the fourth embodiment, a central angle θ2 formed by the guide shaft 135A and the rotation regulating portion 435C, and the center axis 102 is less than 180 degrees. Therefore, enlarging deflection amount between the optical axis 101 and the center axis 102 of the lens body, which is a fixed barrel, it is stabilized and rotation regulation can be performed.

The present invention is not restricted to the embodiments described above, but they can be modified as appropriate. For example, the structure of the image pickup optical system is not restricted to a zoom lens system including three lens groups, but may be a zoom lens system including two, or four or more lens groups. Depending on the structure of the zoom lens system, any one of the lens barrels according to the first to fourth embodiments is appropriately selected.

Also, the image pickup optical system may be a fixed-focal-length lens system. In this case, it is known that the entire or part of the lens groups are let out for focusing. To a lens barrel of such a fixed-focal-length lens system, any one of the lens barrels according to the first through fourth embodiment may be applied.

Furthermore, in the lens barrel according to each embodiment, the rotation regulating portion of the lens frame engages with the shaft disposed along a direction parallel to the optical axis. This is not meant to be restrictive. For example, the rotation regulating portion may engage with a component such as a guide groove provided outside of the lens frame and inside of the cam barrel along the direction parallel to the optical axis.

Still further, in the image pickup device according to the first, second and fourth embodiments, the magnetic circuit has a structure such that the stator includes a stator coil and the rotor includes a rotor magnet. This is not meant to be restrictive. The electromagnetic motor may be configured such that the stator includes a stator magnet, and the rotor includes a rotor coil.

Figure 10:
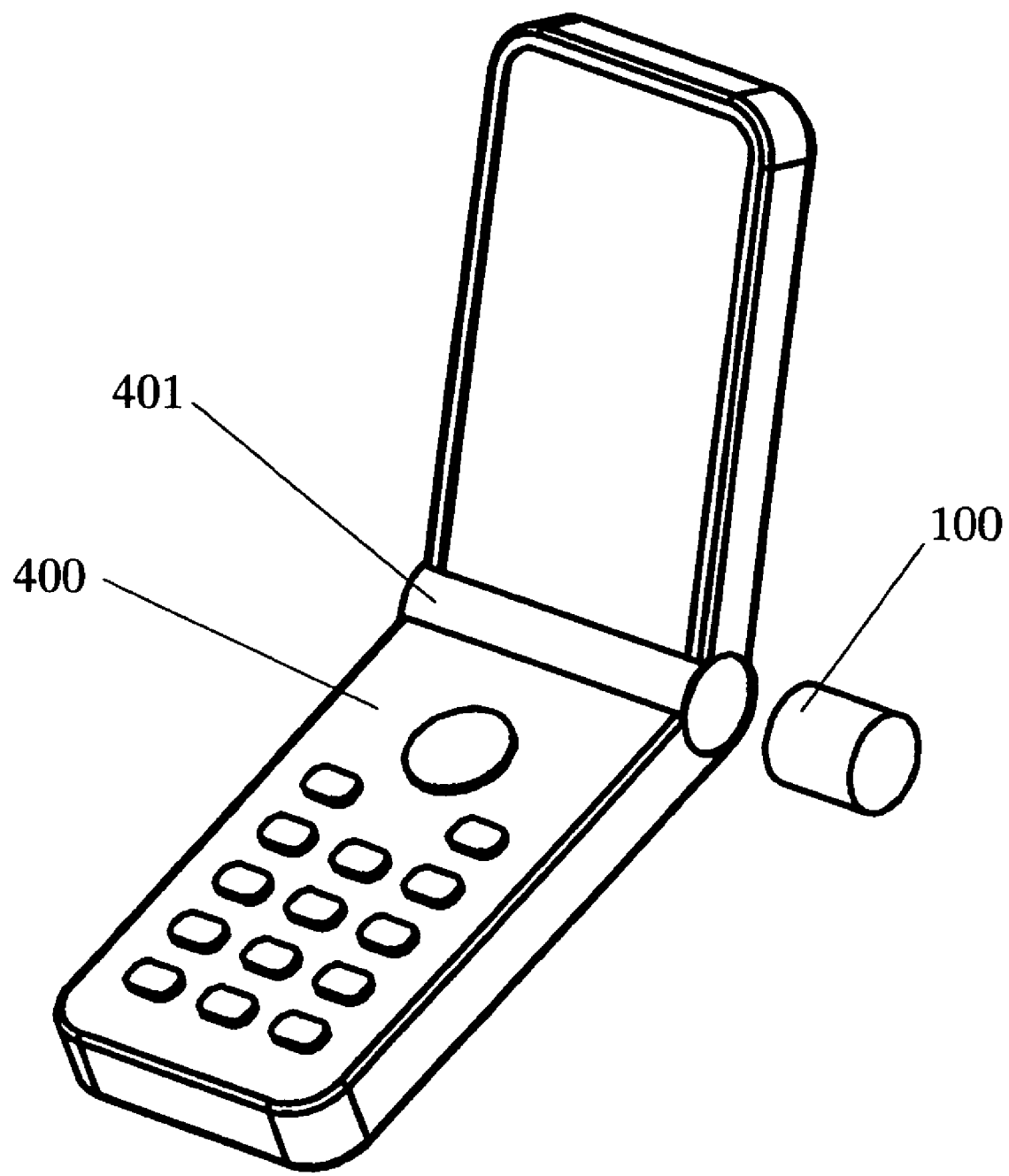
FIG. 10 is a perspective view showing an example of a cellular phone to which the image pickup device according to the present invention is applied.

FIG. 10 is a perspective view showing an example of a cellular phone to which the image pickup device according to the present invention is applied. A cellular phone 400 is of a fold-down type, and is provided with a hinge portion 401. In this example, the image pickup device 100 according to the first embodiment is provided on this hinge portion 401 of the cellular phone 400. As described above, the image pickup device 100 is made compact in size in a direction perpendicular to the optical axis, with the center axis of the fixed barrel and the optical axis of the lens groups being deflected from each other in parallel. Therefore, the hinge portion 401 can be made compact in size. Thus, the image pickup device 100 allows the cellular phone 400 to be made compact in size.

As a matter of course, the image pickup device 100 can be disposed at a portion other than the hinge portion 401. Being made compact particularly in the direction perpendicular to the optical axis, the image pickup device 100 can contribute downsizing of the cellular phone wherever the image pickup device 100 is disposed.

The image pickup device 100 may be incorporated in digital still cameras, digital video cameras, Personal Digital Assistants (PDAs), or the like for making these devices compact. Also, in place of the image pickup device 100, the image pickup devices according to the second, third and fourth embodiments may be disposed onto the above-stated devices.

According to the present invention, a lens barrel that is compact in size in a direction perpendicular to the optical axis of the lens element can be provided. Also, according to the present invention, an image pickup device that is compact in size and includes the above lens barrel can be provided.

While the invention has been described in detail, the foregoing description is in all aspects illustrative and not restrictive. It is understood that numerous other modifications and variations can be devised without departing from the scope of the invention.

What is claimed is:

1. A lens barrel for movably holding a lens group along an optical axis, comprising:
    a fixed barrel having an approximately cylindrical shape;
    a lens frame disposed inside of the fixed barrel for holding the lens group;
    at least one shaft engaging in the lens frame for guiding the lens frame in a direction parallel to the optical axis of the lens group; and
    a rotation regulating portion provided to a perimeter of the lens frame for regulating a rotation of the lens frame about the shaft, wherein the lens frame is disposed in the fixed barrel so that a center axis of the fixed barrel and the optical axis of the lens group do not coincide with each other, but are deflected in parallel, and
    the rotation regulating portion and the shaft, which is an axis of said rotation regulated by the rotation regulating portion, are disposed so that a central angle formed with respect to the center axis of the fixed barrel is less than 180 degrees.

2. The lens barrel according to claim 1, wherein
    the rotation regulating portion and the shaft, which is an axis of said rotation regulated by the rotation regulating portion, are disposed so that the central angle formed with respect to the center axis of the fixed barrel is less than 90 degrees.

3. The lens barrel according to claim 1, further comprising:
    a cylindrical electromagnetic motor that is coaxial with the fixed barrel and includes a rotor rotating about the center axis of the fixed barrel; and
    a converting mechanism for converting a rotating motion of the rotor to a straight-ahead motion along a direction parallel to an optical axis of the lens frame.

4. The lens barrel according to claim 3, wherein
    the converting mechanism includes a cam barrel connected to the rotor, and a cam pin provided to the lens frame.

5. An image pickup device that outputs an electrical image signal representing an image of a subject, comprising:
    an image pickup optical system including a predetermined lens group for forming the optical image of the subject;
    an image pickup sensor for receiving the optical image formed by the image pickup optical system and converting the optical image to the electrical image signal; and
    a lens barrel for holding an entire or part of the lens group of the image pickup optical system, wherein
    the lens barrel includes:
        a fixed barrel having an approximately cylindrical shape;
        a lens frame disposed inside of the fixed barrel for holding the lens group;
        at least one shaft engaging in the lens frame for guiding the lens frame in a direction parallel to the optical axis of the lens group; and
        a rotation regulating portion provided to a perimeter of the lens frame for regulating a rotation of the lens frame about the shaft,
    the lens frame is disposed in the fixed barrel so that a center axis of the fixed barrel and the optical axis of the lens group do not coincide with each other, but are deflected in parallel, and
    the rotation regulating portion and the shaft, which is an axis of said rotation regulated by the rotation regulating portion, are disposed so that a central angle formed with respect to the center axis of the fixed barrel is less than 180 degrees.

6. An image pickup device that outputs an electrical image signal representing an image of a subject, comprising:
    an image pickup optical system including a predetermined lens group for forming the optical image of the subject;
    an image pickup sensor for receiving the optical image formed by the image pickup optical system and converting the optical image to the electrical image signal; and
    a lens barrel for holding an entire or part of the lens group of the image pickup optical system, wherein
    the lens barrel includes:
        a lens frame disposed inside of the fixed barrel for holding the lens group;
        an elecfromagnetic motor for causing the lens frame to move along an optical axis of the image pickup optical system;
        at least one shaft engaging in the lens frame for guiding the lens frame in a direction parallel to an optical axis of the lens group; and
        a rotation regulating portion provided to a perimeter of the lens frame for regulating a rotation of the lens frame about the shaft,
    the electromagnetic motor includes a magnetic circuit that is rotationally symmetric about a symmetry axis parallel to the optical axis,
    the lens frame is disposed in the fixed barrel so that the symmetry axis of the magnetic circuit and the optical axis of the lens group do not coincide with each other, but are deflected in parallel, and
    the rotation regulating portion and the shaft, which is an axis of said rotation regulated by the rotation regulating portion, are disposed so that a central angle formed with respect to the symmetry axis of the magnetic circuit is less than 180 degrees.

7. The image pickup device according to claim 6, wherein
    the lens barrel includes a cylindrical fixed barrel,
    the electromagnetic motor includes a cylindrical rotor with the lens frame disposed therein, and
    the magnetic circuit includes a coil provided to either one of a stator provided the fixed frame and the rotor, and a magnet provided to another one of the stator and the rotor.

8. The image pickup device according to claim 6, wherein the magnetic circuit includes a coil wound about a perimeter of the lens frame, and a magnet disposed outside of the lens frame.

9. The lens barrel according to claim 1, wherein the central angle is formed on a plane perpendicular to the center axis.

* * * * *